US012024311B1

(12) United States Patent
Helzer

(10) Patent No.: US 12,024,311 B1
(45) Date of Patent: Jul. 2, 2024

(54) REMOTELY OPERABLE COVER FOR AIRCRAFT REFUELING BOOM

(71) Applicant: Jacob Helzer, APO, AE (US)

(72) Inventor: Jacob Helzer, APO, AE (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 48 days.

(21) Appl. No.: 17/888,350

(22) Filed: Aug. 15, 2022

(51) Int. Cl.
*B64F 1/00* (2024.01)

(52) U.S. Cl.
CPC .................................. *B64F 1/005* (2013.01)

(58) Field of Classification Search
CPC ............. B64F 1/00; B64F 1/005; A01K 15/00
See application file for complete search history.

(56) References Cited

U.S. PATENT DOCUMENTS

| 3,475,001 | A | * | 10/1969 | Hieber | B64D 39/06 244/172.4 |
| 4,129,270 | A | * | 12/1978 | Robinson | B64D 39/00 74/506 |
| 5,573,206 | A | * | 11/1996 | Ward | B64D 39/00 244/135 A |
| 5,778,826 | A | * | 7/1998 | Dillon | A01K 15/00 D30/162 |
| 6,598,335 | B2 | * | 7/2003 | Akhtar | A01K 23/005 43/12 |
| 6,779,758 | B2 | * | 8/2004 | Vu | B64D 39/00 244/135 A |
| 6,966,525 | B1 | * | 11/2005 | Schroeder | B64D 39/00 244/135 A |
| 7,036,770 | B2 | * | 5/2006 | Shelly | B64D 47/02 244/135 A |
| 8,176,878 | B1 | * | 5/2012 | Wexler | A01K 25/00 119/799 |
| 11,148,825 | B2 | * | 10/2021 | Hasmann | B64D 39/00 |
| 2003/0205643 | A1 | * | 11/2003 | von Thal | B64D 39/00 244/135 A |
| 2003/0209633 | A1 | * | 11/2003 | Thal | B64D 39/06 244/135 A |
| 2006/0191542 | A1 | * | 8/2006 | Dillon | A01K 77/00 128/869 |
| 2010/0025536 | A1 | * | 2/2010 | Schroeder | B64D 39/06 244/135 A |
| 2010/0146838 | A1 | * | 6/2010 | Contreras | A01K 97/00 43/87 |
| 2013/0168497 | A1 | * | 7/2013 | Rix | B64D 3/00 244/135 A |

(Continued)

*Primary Examiner* — Justin M Benedik
(74) *Attorney, Agent, or Firm* — AFMCLO/JAZ; Larry L. Huston

(57) ABSTRACT

A boom cover for covering a refueling boom, particularly a flying boom, of a refueling aircraft. The boom has a closure which has a shield sized to cover the open end of the refueling boom, to prevent intrusion of debris, animals, etc. The closure has a hoop for circumscribing the boom and drawing the shield taut for remaining on the boom and flaccid for attachment to and removal from the boom. The closure may be attached to and removed from the boom by a longitudinally rotatable handle which is manipulated by a ground operator. Optionally the handle may be removable from the closure for use on subsequent aircraft or storage.

20 Claims, 11 Drawing Sheets

(56) References Cited

U.S. PATENT DOCUMENTS

2016/0023775 A1* 1/2016 Hatcher ................ B64D 39/00
                                                244/135 A
2019/0023355 A1* 1/2019 Miller .................... B63B 21/04

* cited by examiner

REMOTELY OPERABLE COVER FOR AIRCRAFT REFUELING BOOM

STATEMENT OF GOVERNMENT INTEREST

The invention described and claimed herein may be manufactured and used by or for the Government of the United States of America for all government purposes without the payment of any royalty.

FIELD OF THE INVENTION

The present invention is related to protective covers for aircraft refueling booms and more particularly to protective covers for elevated aircraft refueling booms which covers are remotely operable from the ground.

BACKGROUND OF THE INVENTION

The first documented air to air refueling occurred Jun. 27, 1923 between two Airco De Haviland DH-4B United States Army Air Service biplanes. During World War II, the Army Air Forces modified B-24 Liberators, to be tankers that refueled the B-17 Flying Fortress, extending the range to 1,500 miles. Air to air refueling has only increased since then. Starting in 1950 the US Air Force is reported to have purchased more than 800 Boeing KC 97 refueling aircraft. In 1956 the Air Force began phasing out the KC 97 in favor of the faster KC 135 Stratotanker. For more than 60 years the KC 135 has provided aerial refueling support to Air Force, Navy, Marine Corps and allied nations. Boeing reports that 732 KC 135 refueling aircraft have been built with more than 600 of these aircraft still in service in the 1990's. Lockheed Martin reports its next generation of refueling aircraft, dubbed the LXMT, is to be the next generation of refueling aircraft. The LXMT uses a flying boom and is certified for several receiving airframes, including F-35A, F-22, F-16, A-10, B1-B, C-17, E-3, E-7, F-15 and P-8A.

During air to air refueling with the KC 97, the KC 135 and the LXMT, fuel is pumped through a refueling boom. To complete an aerial refueling, the tanker and receiver aircraft rendezvous, flying in formation. The receiver moves to a position behind and below the tanker, within safe limits of travel for the boom, aided by director lights or directions radioed by the boom operator. Once in position, the operator extends the boom to make contact with the receiver aircraft. Once in contact, fuel is pumped through the boom into the receiver aircraft. When the desired amount of fuel has been transferred, the two aircraft disconnect and the receiving aircraft departs the formation. When not in use, the boom is stored flush with the bottom of the tanker fuselage to minimize drag. On ground, the refueling boom is elevated several meters above ground level, due to the large size of refueling aircraft.

The refueling boom has a proximal end joined to the KC 97, KC 135, LXMT or other refueling aircraft and a distal end remote from and depending from the proximal end. The distal end is removably and temporarily connected to the aircraft to be refueled. There are two primary types of refueling booms, a flying boom operated by ruddervators and a probe-and-drogue boom. The flying boom is a rigid, telescoping tube with movable flight control surfaces that an operator on the tanker aircraft extends and inserts into a receptacle on the receiving aircraft. The flying boom is attached to the rear of the tanker aircraft. The attachment is gimballed, allowing the boom to move with the receiver aircraft. The boom contains a rigid pipe to transfer fuel. The fuel pipe ends in a nozzle with a flexible ball joint. The nozzle mates to the receiving aircraft during fuel transfer. A poppet valve in the end of the nozzle prevents fuel from exiting the tube until the nozzle properly mates with the receiver's refueling receptacle. Once properly mated, toggles in the receptacle engage the nozzle, holding it locked during fuel transfer. Between 1950 and 1951 more than 100 B-29's are reported to have been converted from a flexible hose refueling system to the flying boom.

This probe and drogue boom employs a flexible hose that trails from the tanker aircraft. The drogue is a fitting resembling a windsock or shuttlecock, attached at its narrow end with a valve to a flexible hose. The drogue stabilizes the hose in flight and provides a funnel to aid insertion of the receiver aircraft probe into the hose. The hose connects to a Hose Drum Unit (HDU). When not in use, the hose/drogue is reeled completely into the HDU. The receiving aircraft has a probe, which is a rigid arm placed on the aircraft's nose or fuselage. This probe is often retracted when not in use, particularly on high speed aircraft. At the end of the probe is a valve that is closed until it mates with the drogue, after which it opens and allows fuel to pass from tanker to receiver. The tanker aircraft flies straight and level and extends the hose/drogue which trails behind and below the tanker under normal aerodynamic forces. The pilot of the receiver aircraft uses normal flight controls to fly the refueling probe directly into the basket. After initial contact, the hose and drogue are pushed forward by the receiving aircraft and the hose is reeled back onto its drum in the HDU. The tanker's main refueling valve opens, allowing fuel to flow to the drogue under pressure. Tension on the hose is aerodynamically 'balanced' by a motor in the HDU so that as the receiver aircraft moves fore and aft, the hose retracts and extends, thus preventing bends in the hose that would cause undue side loads on the probe.

The refueling boom embodiment comprises an outer boom and inner boom. The outer boom and inner boom are raised or lowered by a series of pulleys and cable to be properly positioned for takeoff, landing and positioning for the receiving aircraft. The inner boom transports the fuel and may act as a shock absorber for the system. Between the inner boom and outer boom are several pulleys, cables, circuitry and other sensitive components. If any of these components are even slightly off-specification, operational capability is adversely affected. Refueling may not be completed and safety may be jeopardized. For example, even a small bend in a cable adversely affects calibration and mission operation. If a pulley is jammed, operational capability is lost.

Accordingly, it is important to protect the flying boom [hereinafter boom] from debris, birds, hornets and other objects from entering the outlet at the distal end of the boom. Therefore, when the aircraft is grounded, a boom cover is placed over the outlet of the boom for protection. According to the current state of the art, to install and later remove the boom cover, a stand is procured and positioned proximate the outlet of the boom. Two personnel are required to position and steady the stand, while a third person climbs the stand to install the boom cover. The person on the stand manually fits the cover over the boom orifice, then secures a nylon strap around the circumference by a self-locking cinch strap. The strap is slidably connected to the cover by loops. The stand is then removed and redeployed as needed. When the boom cover is to be removed, the stand is brought back to that particular aircraft and the process is repeated in reverse.

But this system has flaws. Personnel often have to wait for aircraft ground crews to find a stand and bring it to the aircraft. A typical base has multiple aircraft, requiring the stand to be circulated as necessary. Once the stand is in place, a member of the ground crew climbs the stand and performs the boom cover installation or removal at a height of at least 2.2 meters—prompting safety concerns. If there is a high wind alert after installation, the process must be repeated to remove the boom covers. After the high wind alert is over, the boom cover must be reinstalled and the process repeated.

The problems noted above have persisted for more 70 years—despite thousands of external boom refueling planes being in use throughout hundreds of military bases and dozens of countries. Obviously, an improved boom cover is needed. A boom cover which can be installed or removed without an elevated stand is needed. A boom cover which reduces personnel time and provides increased safety is needed. The present invention seeks to provide a solution for this long-felt need.

SUMMARY OF THE INVENTION

In one embodiment the invention comprises a closure for covering an elevated refueling boom of an aircraft. The closure comprises a wishbone, the wishbone has at least two opposed divergent tines, each the tine extends from a proximal end to a distal end remote therefrom, the proximal ends of the tines being closely spaced to be joined at a confluence, the distal ends being spaced apart and defining a space therebetween, each tine comprising a hollow tube for slidably holding a hoop therein, a hollow confluence frame, the confluence frame being threaded with confluence frame threads, a hollow carrier, the carrier having carrier threads complementary to and engaged with the confluence frame threads, the carrier and the confluence frame being defining a longitudinal axis and being rotatable one relative to the other about the longitudinal axis, a single hoop disposed in the tines to form a closed loop, the hoop having two free ends extending from the proximal ends of the tines and being inserted into the hollow carrier and being nonrotatably joined thereto, the hoop being alternatingly taut and flaccid in response to relative rotation between the confluence frame and the carrier whereby the closure can be attached to and removed from a refueling boom of an aircraft by relative rotation between the confluence frame and the carrier and an impermeable shield joined to the hoop and filling the space of the wishbone, the shield being sized to cover a refueling boom of an aircraft when said closure is attached thereto.

In another embodiment the invention comprises a boom cover. The boom cover has the aforementioned closure and a handle usable therewith. The handle comprises an extension pole for grasping by a user and being operable by the user to transmit torque from the handle to the closure through a driver. The driver may provide for releasable attachment of the pole and closure. An optional clutch may be interposed to provide a stall torque and prevent over-tightening of the hoop around the refueling boom, alerting the user that sufficient tightening has occurred and the handle may be disconnected.

BRIEF DESCRIPTION OF THE DRAWINGS

All drawings are to scale, except those drawings specifically listed as schematic.

DETAILED DESCRIPTION OF THE INVENTION

As used herein the words 'joined' and 'connected' are used interchangeably unless otherwise specified, and both refer to components which are directly joined together without an intervening element and to components which are operably connected through one or more intervening elements.

Figure 1:
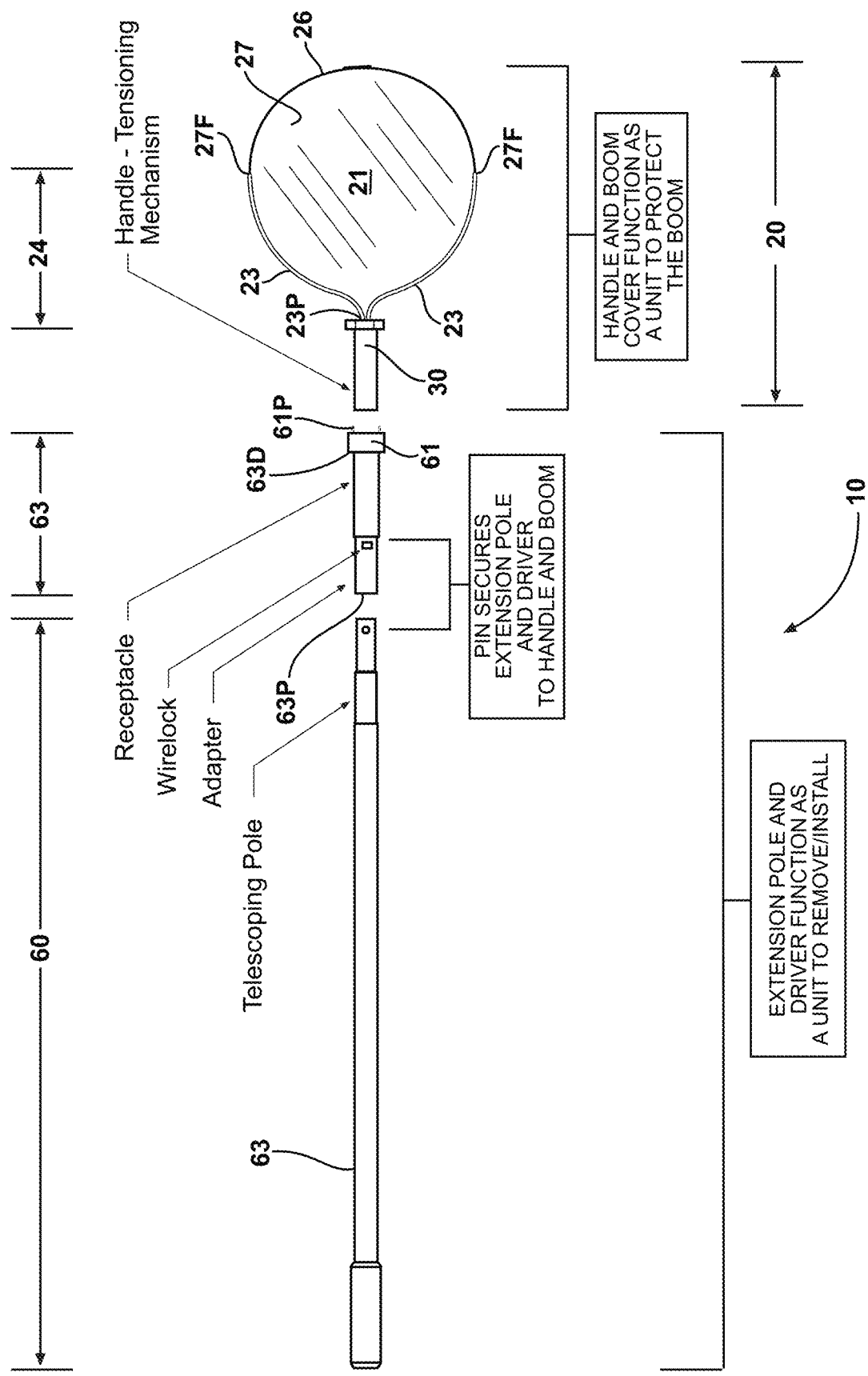
FIG. 1 is an exploded view of a boom cover assembly according to one embodiment of the present invention, the shield being omitted for clarity.

Referring to FIG. 1 a boom cover 10 according to the present invention comprises two major components, a closure 20 and a releasably attachable handle 60. The closure 20 comprises a prophylactic shield 21 attached to a closed hoop 27 with in turn is supported by a wishbone 24 frame which in turn is supported by a confluence frame 30. The handle 60 comprises a driver 61, optionally connected to a clutch 70, and an extension pole 63 for grasping by a user.

Figure 2:
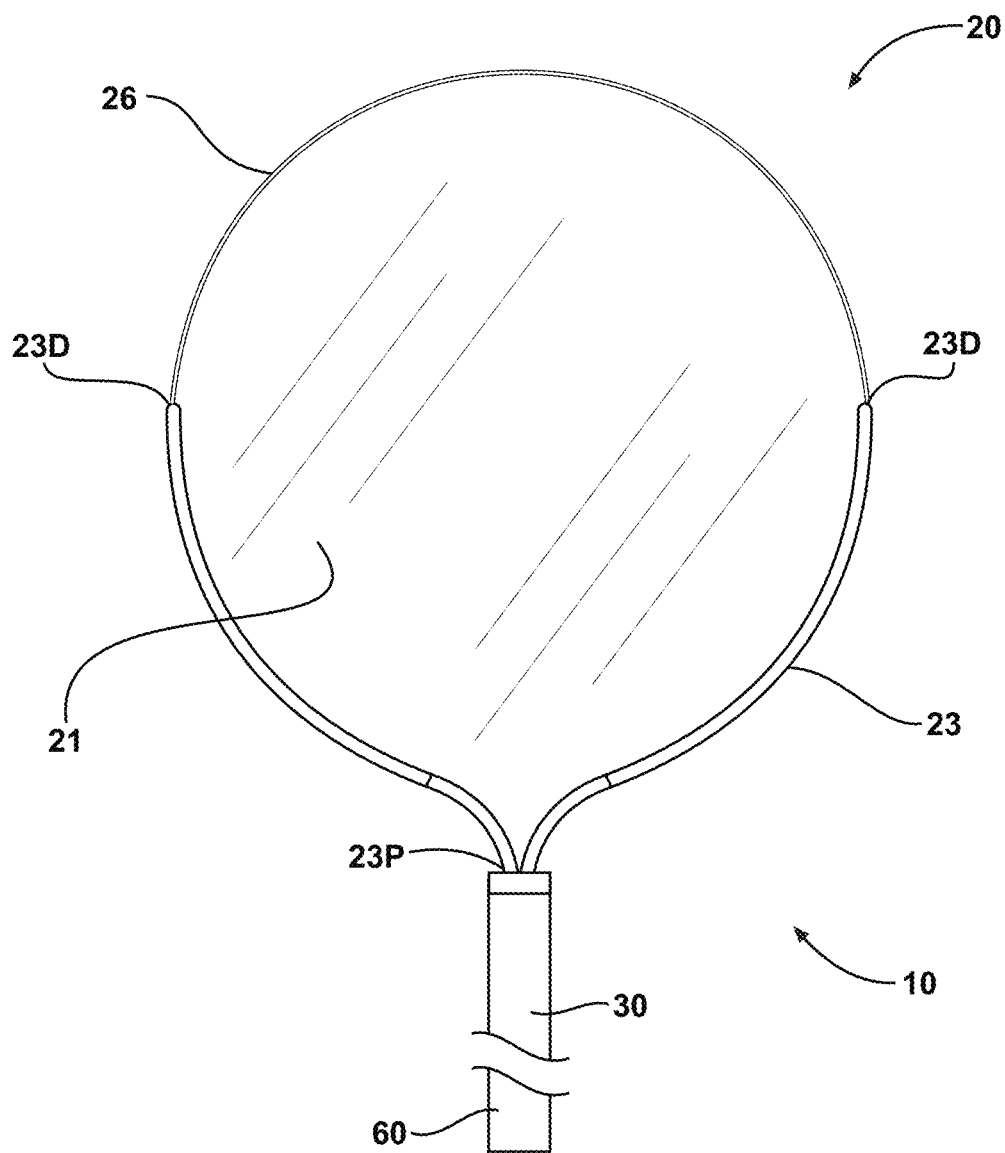
FIG. 2 is a schematic broken frontal view of a boom cover according to the present invention.

Referring to FIG. 2, and examining the invention in more detail, the shield 21 comprises any initially flaccid cloth which can provide a barrier over the open end of the boom and be impermeable to most debris found on an airport tarmac, birds, wasps, hornets, etc. The flaccid cloth is reversibly drawn taut in use, as described below. The cloth may be woven or nonwoven, scrim reinforced nonwoven fabric and generally made of any synthetic material such as nylon, PET, polyester and blends thereof.

The shield 21 is perimetrically attached to a cord 26, generally forming a circle at the perimeter. The shield 21 may be sewn or zipped around the cord 26 in any manner which provides for secure attachment and subsequent release of the closure 20 around the boom. While a single shield 21 is shown, plural shields 21 may be stacked in series to provide additional and more selective protection to the opening of the boom.

The circumference of the hoop 27 is measured at the inside of the tines 23 and hoop 27, bridging the opening where the divergent tines 23 enter the confluence frame 30.

Figure 3A:
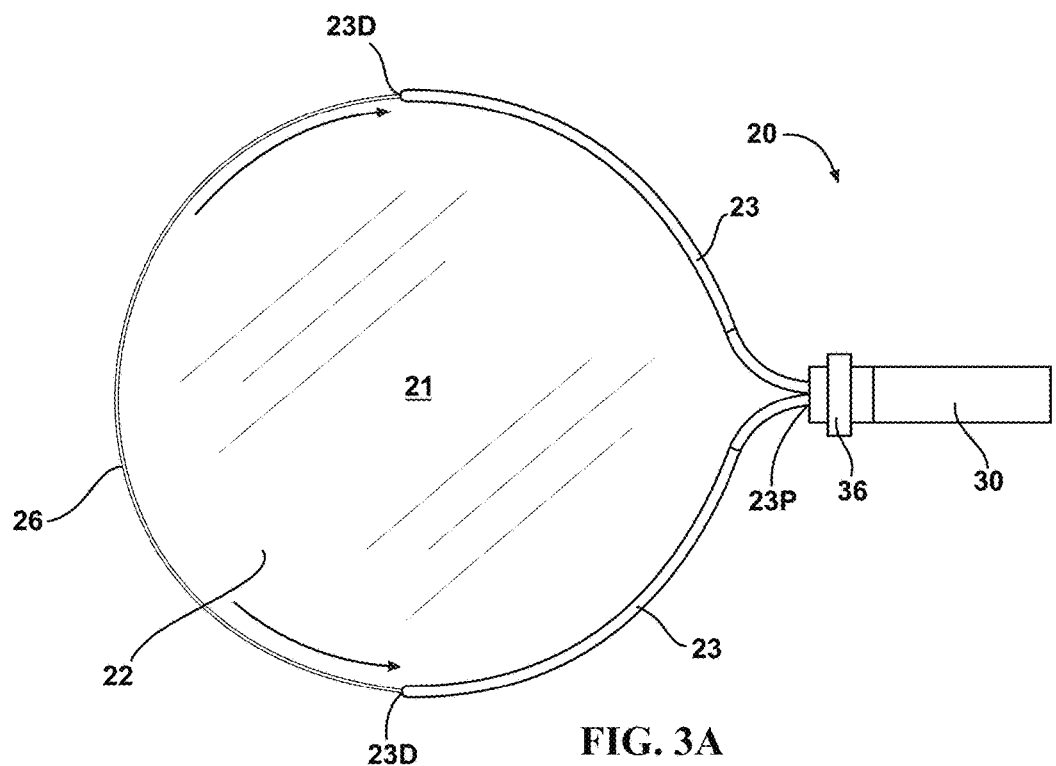
FIG. 3A is a frontal view of the closure of FIG. 1, with tightening of the loop occurring in the direction of the arrows, the shield being omitted for clarity.

Referring to FIG. 3A, the hoop 27 forms a closed loop for fitting around the boom of the respective aircraft. The hoop 27 is made of a retractable cord 26, which forms a snare upon tightening as described below. Preferably a single cord 26 is used for strength, and extends from a first free end 26F to a second free end 26F, whereby the free ends 26F are anchored as described below within the confluence frame 30 as described below.

For a KC 135 aircraft, the hoop 27 may have a circumference ranging from 100 to 107 centimeters when taut and 110 to 122 centimeter, preferably 112 to 117 centimeters when loose. The divergent tines 23 have a maximum diametrical spacing of 30 to 40 centimeters and preferably 33 to 38 centimeters. The cord 26 of the hoop 27 may be made of braided stainless steel cable, nylon rope, wire rope, etc. as desired. A hoop 27 made of 3 mm diameter braided stainless wire rope has been found suitable.

The hoop 27 is constrained to a generally circular closed form by a wishbone 24. The wishbone 24 is a frame which forms a rigid foundation for the retractable cord 26. The wishbone 24 has divergent tines 23 rigidly joined at respective proximal ends 23P and a preferably rectilinear, confluence. The tines 23 extend laterally to spaced apart distal ends 23D. The proximal ends 23P of the tines 23 may optionally be welded together for additional strength and resistance to rotation. The tines 23 preferably define a plane. The wishbone 24 preferably, but not necessarily, comprises symmetrically opposite closed tubes which hold the hoop 27 in position and in the desired form. The tines 23 of the wishbone 24 are preferably planar and define a plane therebetween. The tines 23 are curvilinear and generally define a semicircular shape therebetween. The wishbone 24 may subtend from about 160 to about 210 degrees, preferably about 170 degrees to about 200 degrees and more preferably about 180 degree to about 190 degrees of the hoop 27.

A typical flying boom of a refueling aircraft is generally ovoid shaped and has a circumference of about 107 to about 109 centimeters. The wishbone 24 and hoop 27 are similarly sized, to fit around and be removably attachable to a refueling boom of an aircraft. More particularly, the ovoid shape has a rounded bottom and smaller radius at the top of the arc. The rigid wishbone 24 is well suited to this boom geometry, such that the wishbone 24 seats against the bottom of the boom, with space between the flaccid cord 26 and the upper portion of the boom. This space provides for convenient placement of the boom cover 10 onto the boom, so that the boom cover 10 is properly disposed on the boom.

The tubes of the wishbone 24 converge to a confluence frame 30. The confluence frame 30 is the portion of the closure 20 which provides an anchor for the two opposed free ends 27F of the hoop 27. The tubes may be made of 304 or 316 stainless steel, rigid plastic or other material suitable for maintaining a generally closed hoop 27 shape. Stainless steel tubes having an outer diameter of about 6 to about 8 millimeters and a wall thickness of 1.2 to 1.6 millimeters has been found suitable. The confluence frame 30, together with the extension pole 63, and related components, define a longitudinal axis LA and associated longitudinal direction for the boom cover 10. As used herein twisting, rotatable and nonrotatable refer to twisting, rotation or absence of rotation about the longitudinal axis LA.

Figure 3B:
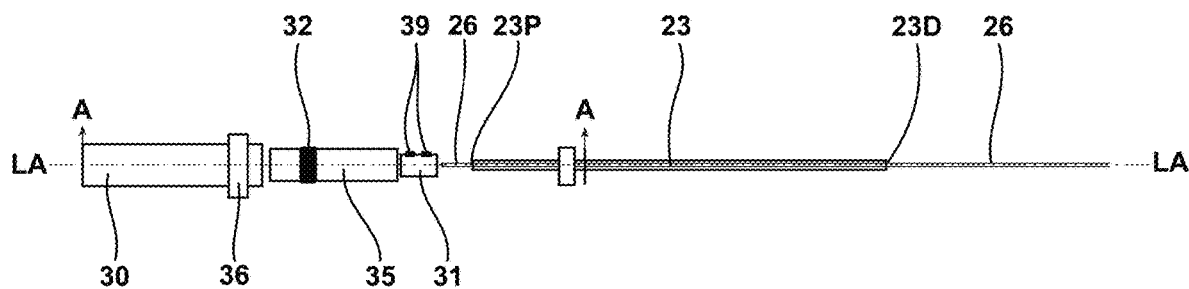
FIG. 3B is an exploded profile view of the closure of FIG. 3A.
Figure 3C:
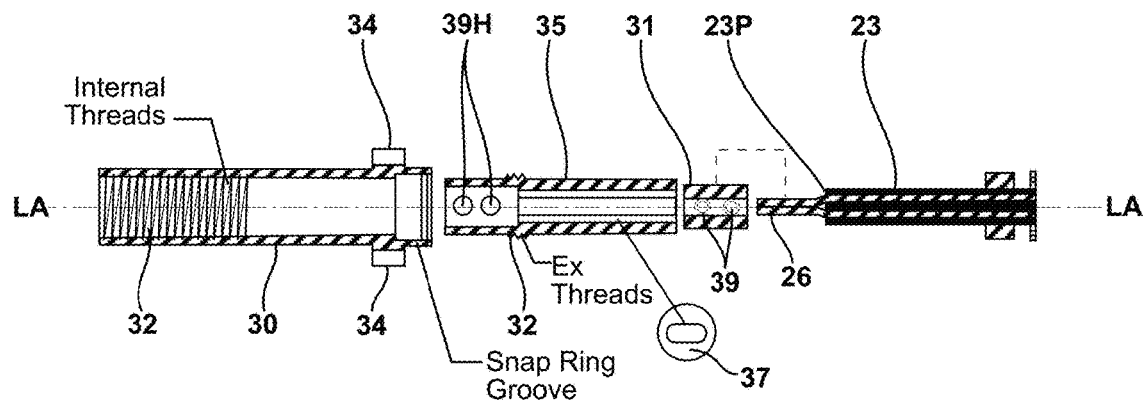
FIG. 3C is a partial exploded sectional view taken along lines A-A of FIG. 3B.

Referring to FIGS. 3B and 3C, the confluence frame 30 may comprise a hollow confluence frame 30 and a hollow carrier 35 internal thereto, both coincident the longitudinal axis LA. The internal carrier 35 fits inside the confluence frame 30 as described below. The carrier 35 has a wall with internal and external surfaces. In one embodiment, the carrier 35 has a sleeve 31 which is not rotatable about the longitudinal axis. The sleeve 31 attaches the free ends 26F of the cord 26 together in nonmovable relationship.

A nonrotatable slotted washer 37 may be disposed internal to the carrier 35. The free ends 27F of the hoop 27 may be are preferably inserted through the slotted washer 37 to reduce twisting during tightening and untightening of the hoop 27 while in use. The slotted washer 37 is disposed intermediate the divergent portions of the wishbone 24 and the free ends 27F of the hoop 27. An internal snap ring 38 may be used to hold the wishbone 24 in place within the confluence frame 30.

The ends of the hoop 27 may be anchored to the confluence frame 30 in any known manner. In one embodiment, as illustrated, the carrier 35 has one or more radial holes 39H to accept grub screws 39. The nonrotatable sleeve 31 is internal to the carrier 35 and has holes tapped and threaded for the grub screws 39 to tighten against the cord 26. The free ends 27H of the hoop 27 are placed adjacent the radial hole(s) 39H and secured in place by tightening the grub screws 39.

During assembly, the sleeve 31 is inserted in the counterbore of the carrier 35. Next the free ends 26F of the cord 26 and wishbone 24 are fed through the slotted bore of the carrier 35. The grub screws are then placed into the clearance holes 39H of the carrier 35 to engage with the threaded holes of the sleeve 31. Then the grub screws 39 are tightened to fasten the ends 26F of the cord 26 to the sleeve 31 and carrier 35.

The carrier 35 is externally threaded to fit into complementary internal threads 32 on the confluence frame 30. As the confluence frame 30 is rotated about the longitudinal axis, the carrier 35 moves in the longitudinal direction towards or away from the shield 21. As the carrier 35 is drawn away from the shield 21, the hoop 27 tightens the shield 21 so that the shield 21 becomes more taut to be securely held around the boom. As the carrier 35 moves towards the shield 21, the shield 21 become more flaccid for insertion onto and removal from the boom.

While an externally threaded carrier 35 and internally threaded confluence frame 30 are shown, one of skill will recognize the invention is not so limited. The carrier 35 may be internally threaded and confluence frame 30 externally threaded, so long as rotational motion of either relative to the other produces longitudinal movement of the wishbone 24 for tightening and loosening of the hoop 27.

Figure 4A:
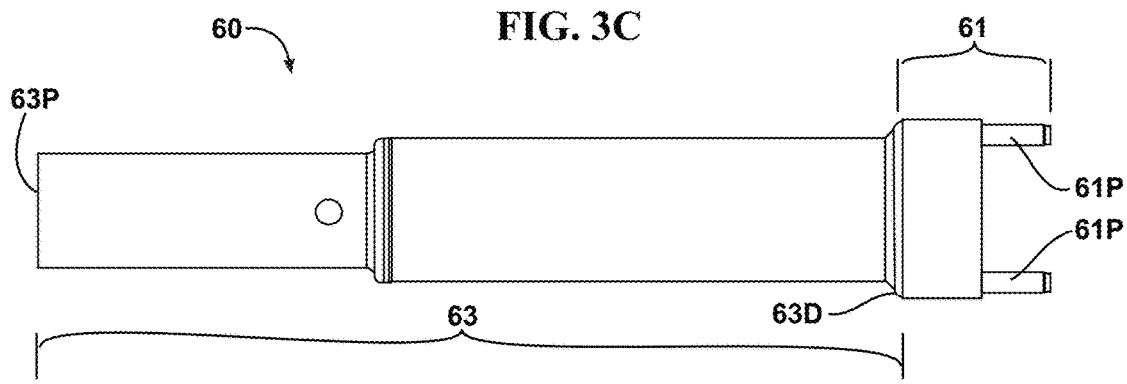
FIG. 4A is a profile view of a telescoping handle.
Figure 4B:
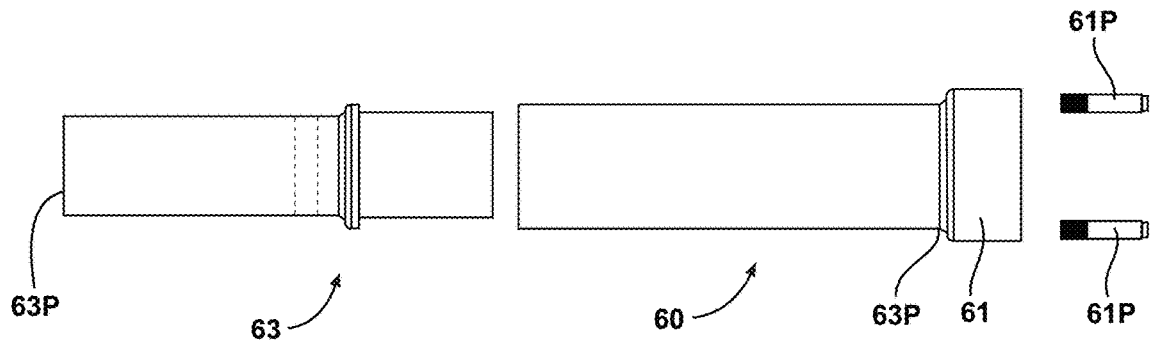
FIG. 4B is an exploded profile view of the telescoping handle of FIG. 4A.

Referring to FIG. 4A and FIG. 4B, the confluence frame 30 preferably has a receptacle 34 to releasably receive the extension pole 63. In one embodiment the receptacle 34 comprises a flange 36 with a plurality of longitudinally parallel holes 34H external to and rigidly affixed to the confluence frame 30, two holes 34H circumferentially 180 degrees out being illustrated in a nonlimiting example. It is to be understood that three holes 34H circumferentially 120 degrees out, four holes 34H circumferentially 90 degrees out, etc. are feasible and within the scope of the invention. The holes 34H removably receive longitudinal pins 61P nonrotatably rigidly affixed to the handle 60 as described below.

Figure 5A:
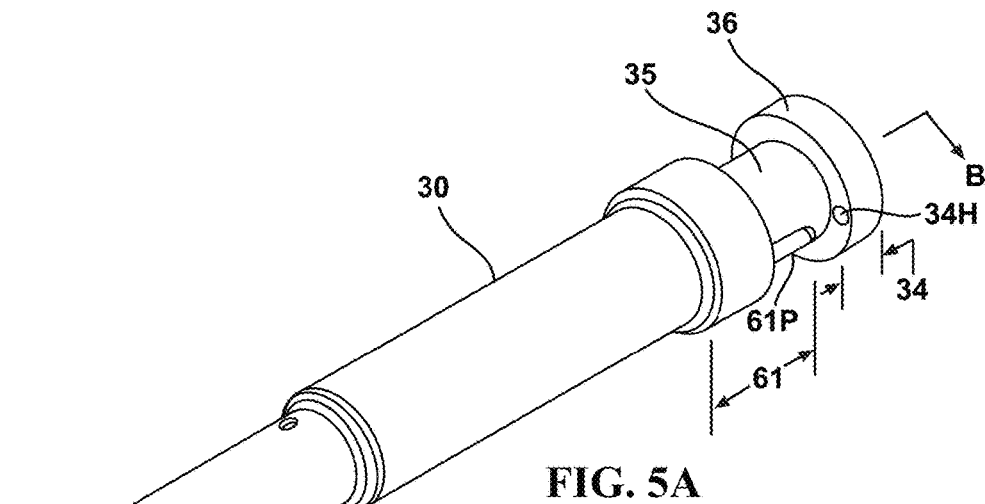
FIG. 5A is a fragmentary perspective view of an extension pole and mating flange of a handle according to the present invention.
Figure 5B:
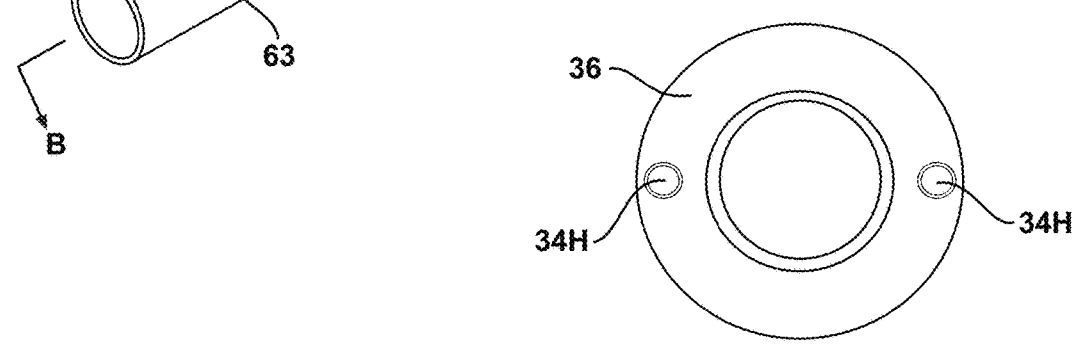
FIG. 5B is an end view of the flange of the confluence frame of FIG. 5A.
Figure 5C:
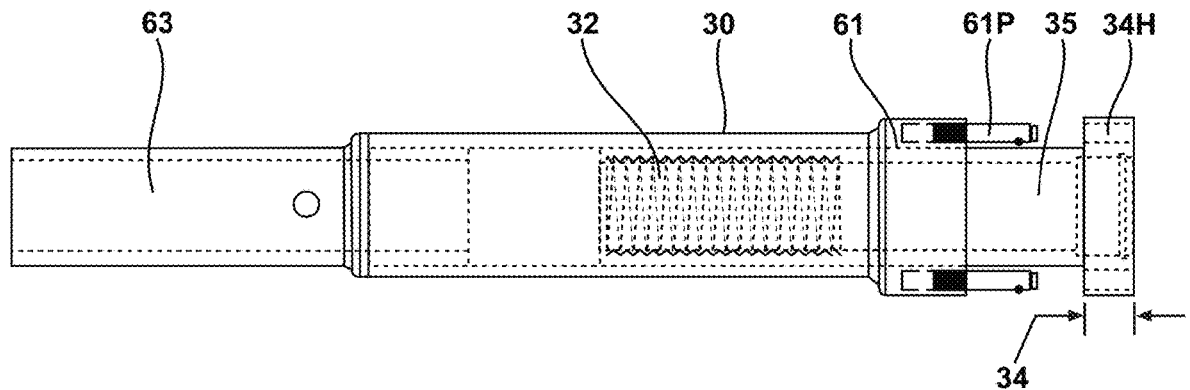
FIG. 5C is a sectional view taken along lines B-B of FIG. 5A.
Figure 6A:
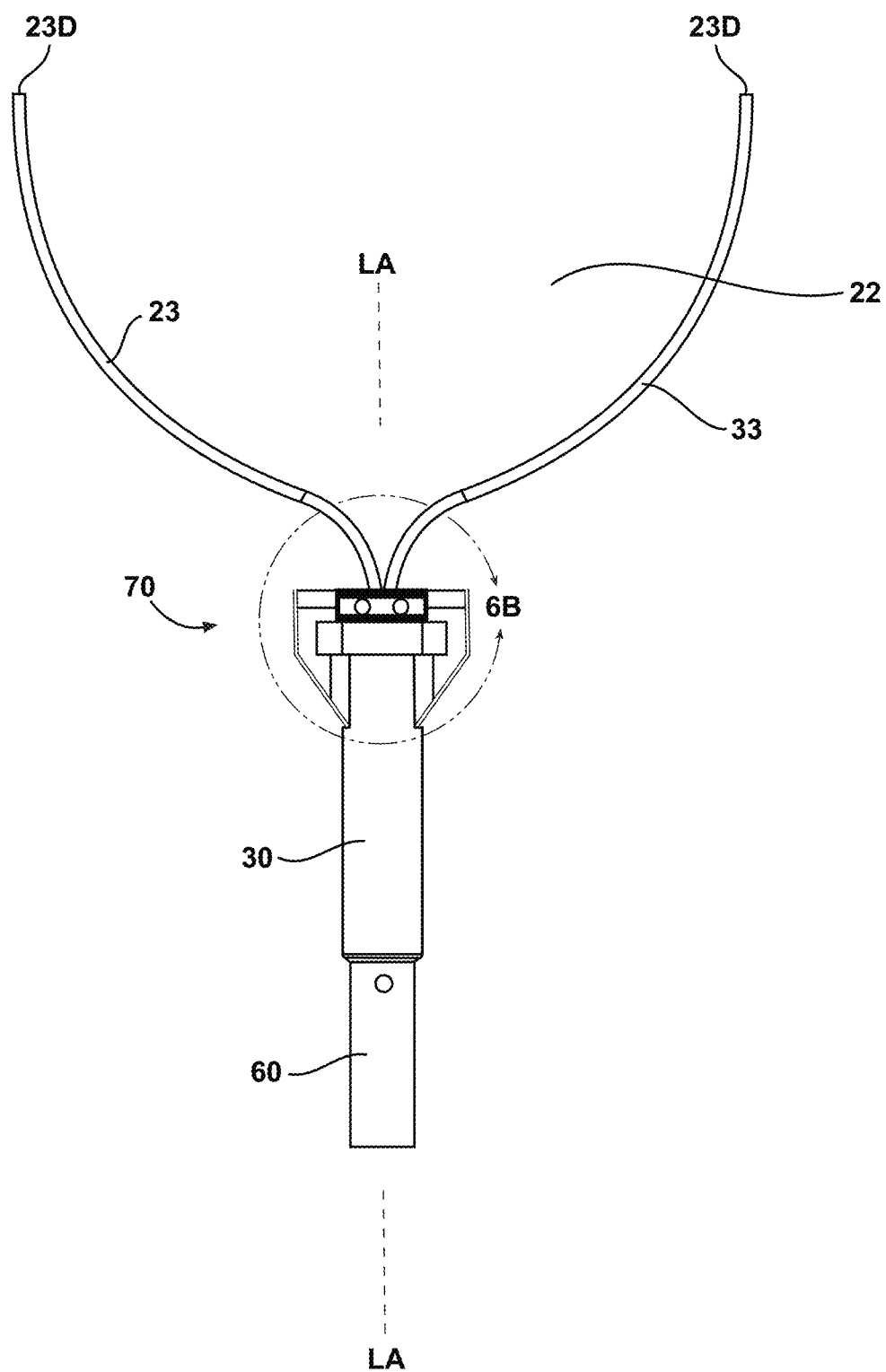
FIG. 6A is a frontal profile view of an alternative embodiment of a boom cover according to the present invention having an optional clutch.
Figure 6B:
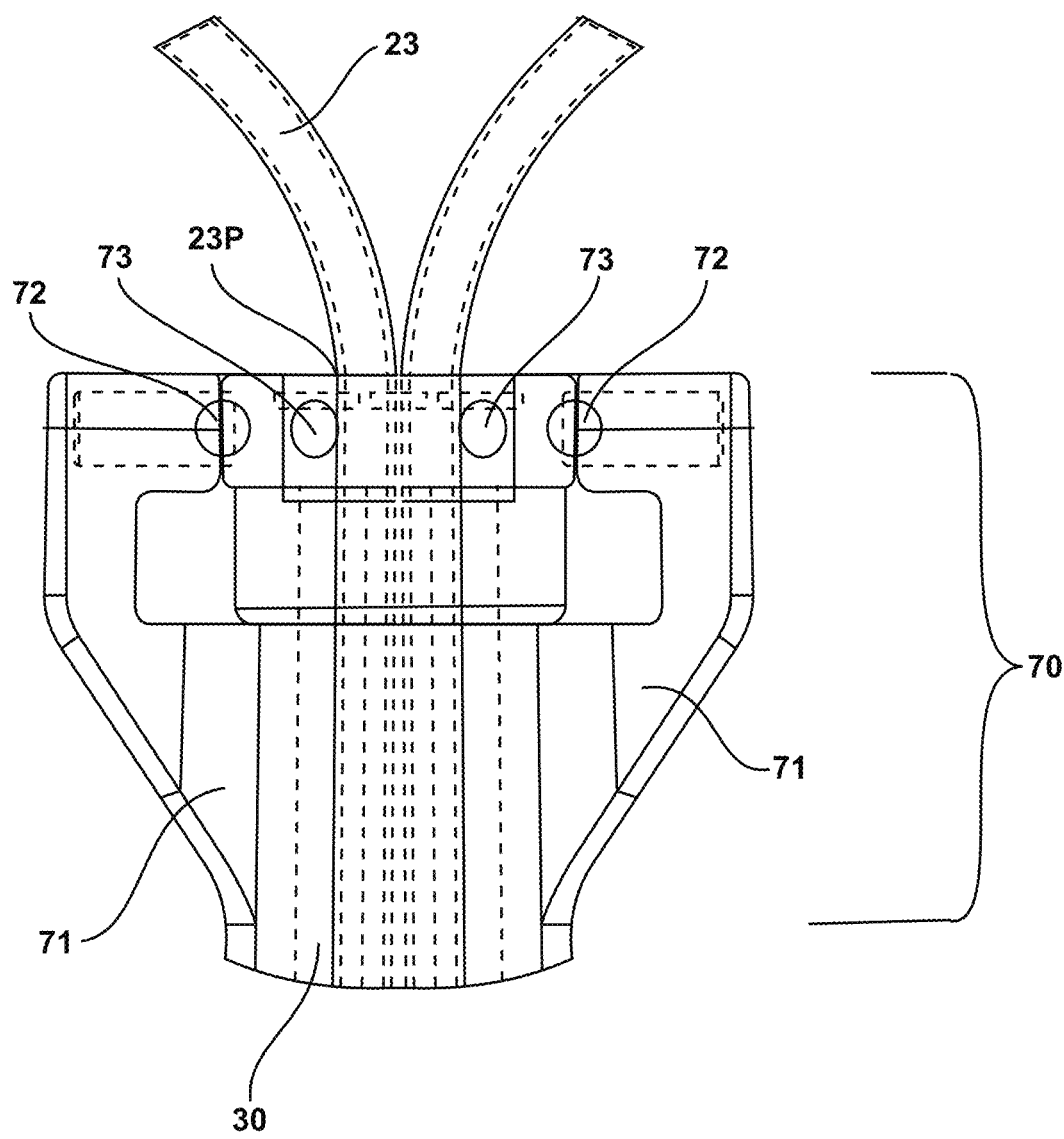
FIG. 6B is an enlarged fragmentary sectional view of the clutch of FIG. 6B, taken at circle 6B of FIG. 6A.
Figure 6C:
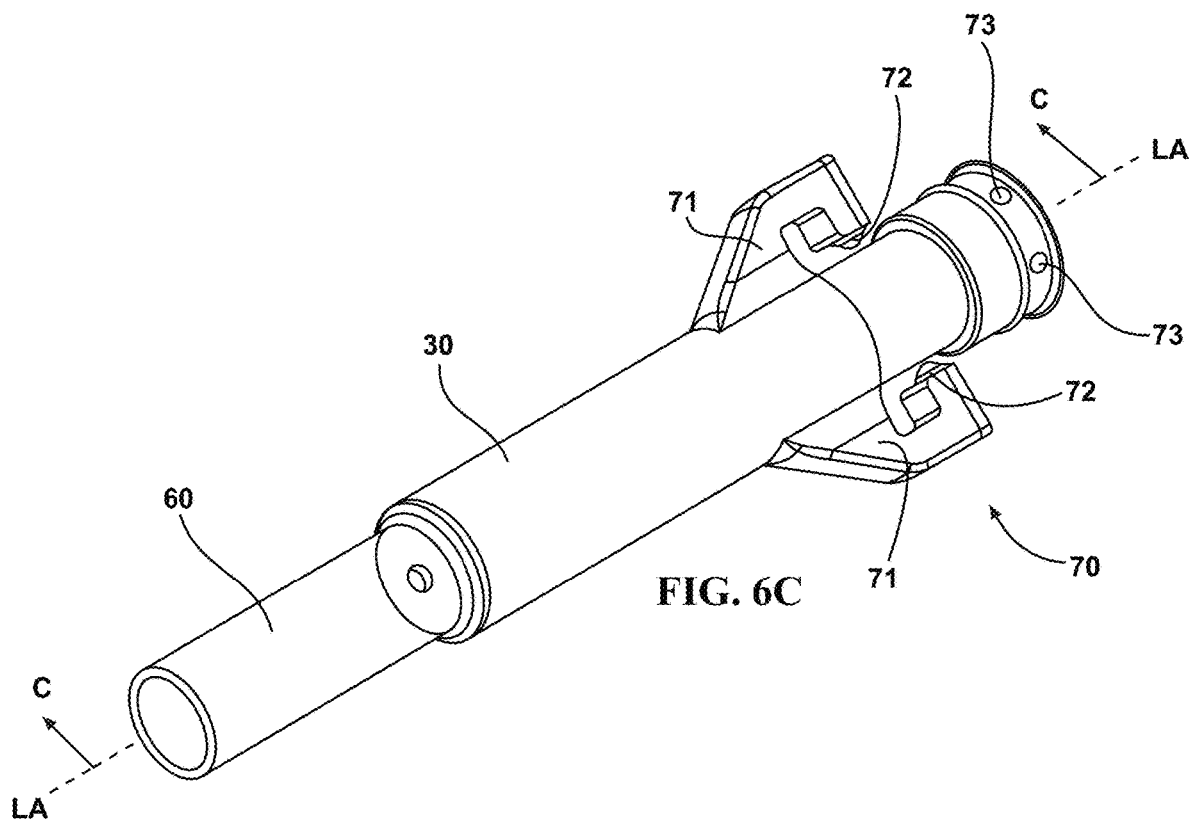
FIG. 6C is a perspective view of the handle of FIG. 6A.
Figure 6D:
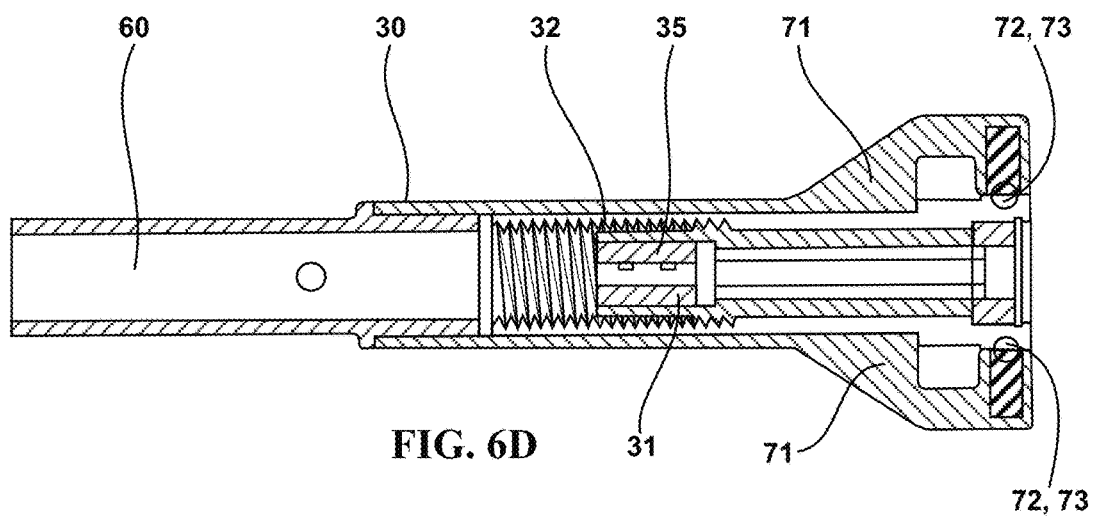
FIG. 6D is a section view taken along lines C-C of FIG. 6C.

Referring to FIG. 5A, FIG. 5B and FIG. 5C the handle 60 mates with and is removable from the closure 20. The driver 61 on the handle 60 is complementary to the receptacle 34 on the closure 20. The driver 61 has longitudinal pins 61P which are slightly smaller in size than the respective holes 34H on the flange 36 for convenient insertion and withdrawal. Preferably the pins 61P are made of hardened steel for strength. In use, the user inserts the pins 61P into the holes 34H and turns the handle 60 as desired to tighten or loosen the hoop 27.

The embodiment illustrates that the pins 61P may be on the handle 60 and holes 34H may be on the closure 20, particularly the confluence frame 30 thereof. But one of skill will recognize the invention is not so limited. If desired, the flange 36 and holes 34H may be on the handle 60 and the mating pins 61P disposed on the closure 20. The holes 34H may be blind holes 34H or through holes 34H. While round pins 61P and holes 34H are shown, one of skill will recognize the invention is not so limited and any suitable shape of congruent holes 34H and pins 61P may be used.

Referring particularly to FIG. 5A and FIG. 5C, the handle 60 may have an extension pole 63 rigidly connected to the driver 61 and optionally longitudinally concentric. The extension pole 63 is preferably lightweight for maneuverability and may be hollow. Preferably the extension is has a telescoping construction for convenient storage. The proximal end 60P of the handle 60 is grasped by the user for operation, transport, etc. The proximal end 60P of the handle 60 may have a foam or rubber coating for user comfort. The distal end 60D of the handle 60 removably connects to the closure 20 for operation thereof. The extension pole 63 may be made of aluminum, steel or any other material which has sufficient rigidity to transfer the torque from the user through the driver 61 to the confluence frame 30 and ultimately the hoop 27. A handle 60 with a suitable extension pole 63 that longitudinally extends from 1 M to 6 M has been found suitable.

Referring to FIG. 6A, FIG. 6B, FIG. 6C and FIG. 6D, the boom cover 10 according to the present invention may optionally comprise a clutch 70 which is incorporated into the driver 61. The clutch 70 is used to tighten the hoop 27 of the closure 20 to a predetermined hoop 27 force as determined by the stall torque. As used herein, hoop 27 force refers to a circumferentially compressive force circumscribing the boom and caused by tightening of the hoop 27 therearound. Preferably the hoop 27 force is sufficient to prevent unintended removal of the closure 20 from the boom (due to high winds and other disturbances) but not so great as to cause damage to the boom.

The clutch 70 comprises a driver 61 having plural outriggers 71 which hold ball bearings 72. The ball bearings 72 fit into dimples 73 disposed on the confluence frame 30, particularly the optional flange 36 thereof. The ball bearings 72 are spring loaded to be biased radially inward towards the longitudinal axis LA. The dimples 73 are complementary to the ball bearings 72 and concave radially inwards to accept the spring loaded ball bearings 72. The outriggers 71 are longitudinally inserted over the dimples 73, so that the ball bearings 72 are seated into the dimples 73. The user twists the handle 60 until the ball bearings 72 are expelled from the dimples 73 and further rotation has no tightening effect.

While an embodiment with two outriggers 71 is shown, it is to be understood that three outriggers 71 spaced 120 degrees out, four outriggers 71 spaced 90 degrees out, etc. are feasible and within the scope of the invention. Furthermore while the outriggers 71 are shown on the handle 60 and the dimples 73 shown on the closure 20 then invention is not so limited. The outriggers 71 may be disposed on the closure 20 and dimples 73 on the handle 60. Optional circumferential collars may be placed on either side of the dimples 73 for additional stability if the users lose their grip.

Figure 7:
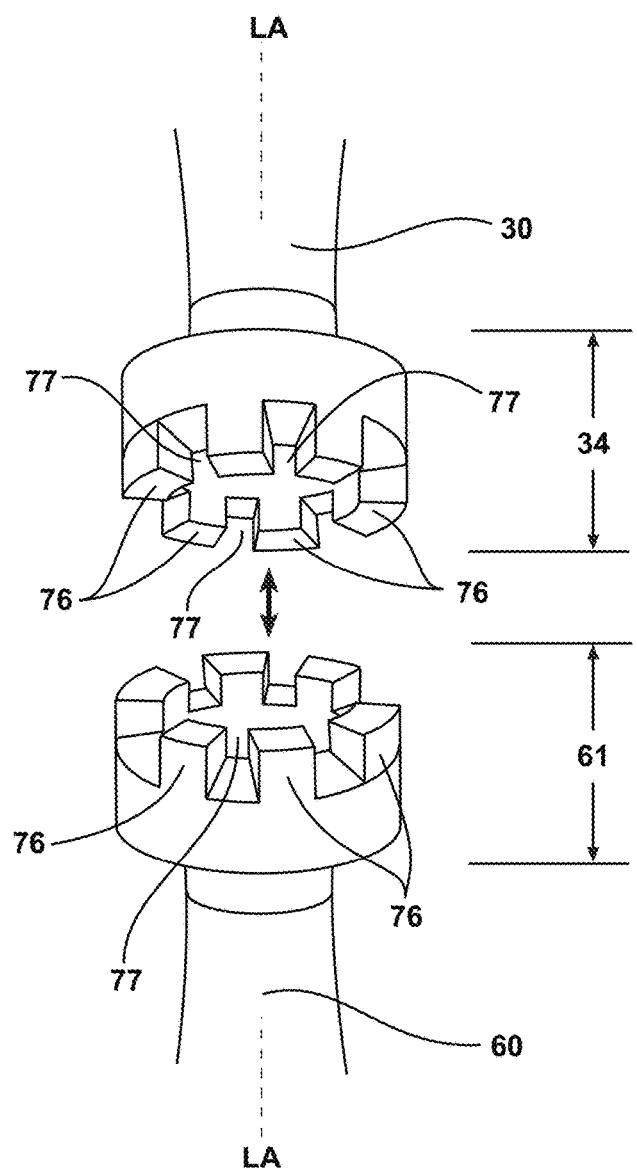
FIG. 7 is schematic a fragmentary perspective view of an alternative embodiment of a driver and confluence frame having mating crenulated surfaces.

Referring to FIG. 7 in an alternative embodiment the driver 61 and confluence frame 30 may have mating, longitudinal crenulated surfaces 76, 77. The merlons 76 and crenels 77 of the crenulations 75 fit together to transmit torque for the handle 60 to the closure 20. While square tooth longitudinal crenulations 75 are shown, the invention is not so limited. The merlons 76 may be sawtooth shaped, radially oriented, etc.

Figures 8, 8A:
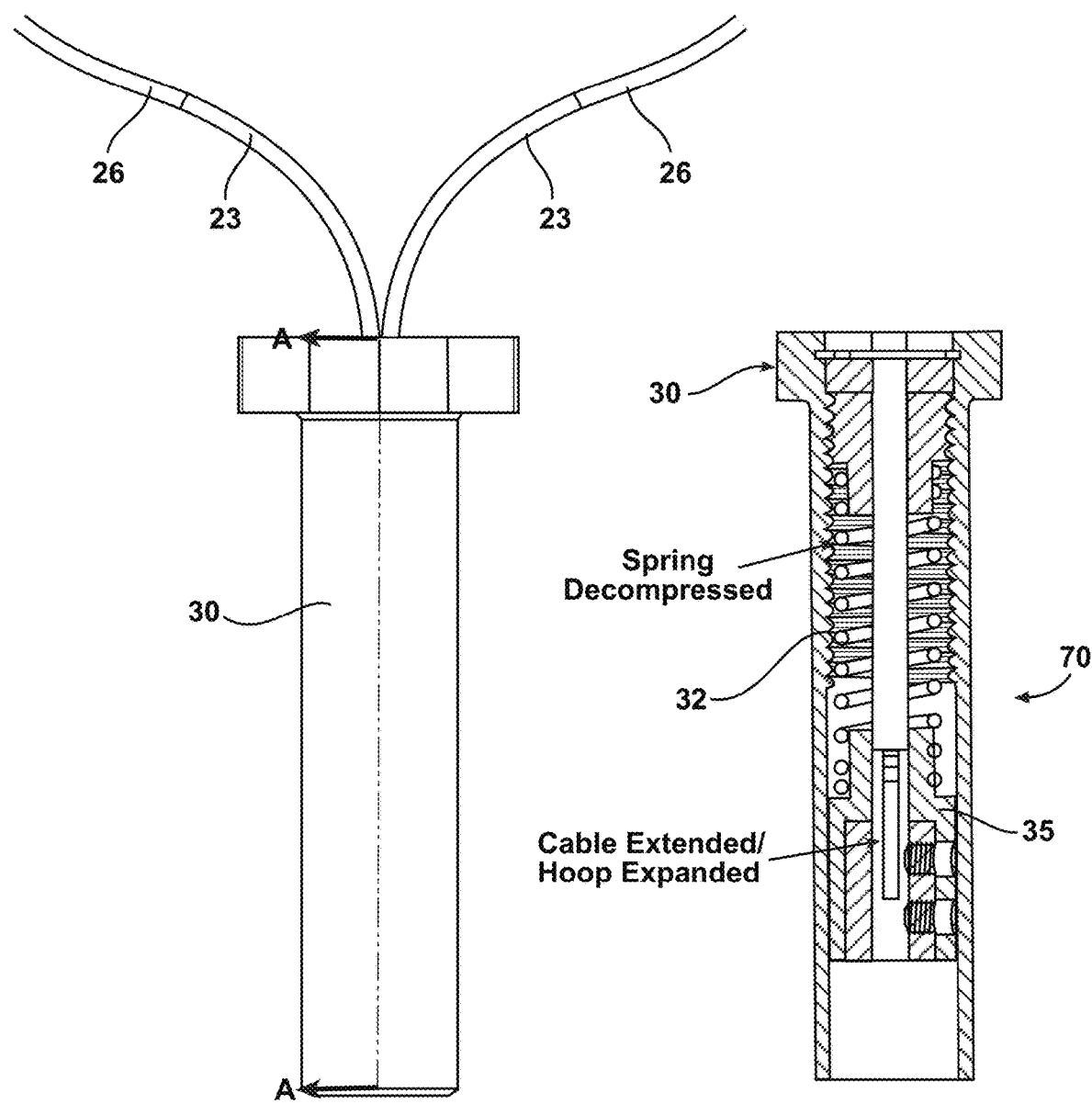
FIG. 8 is a partial front elevational of a confluence frame according to another embodiment of the invention.
FIG. 8A is a sectional view taken along line A-A of FIG. 8, showing the boom cover assembly in a loosened configuration for installation and removal.
Figure 8B:
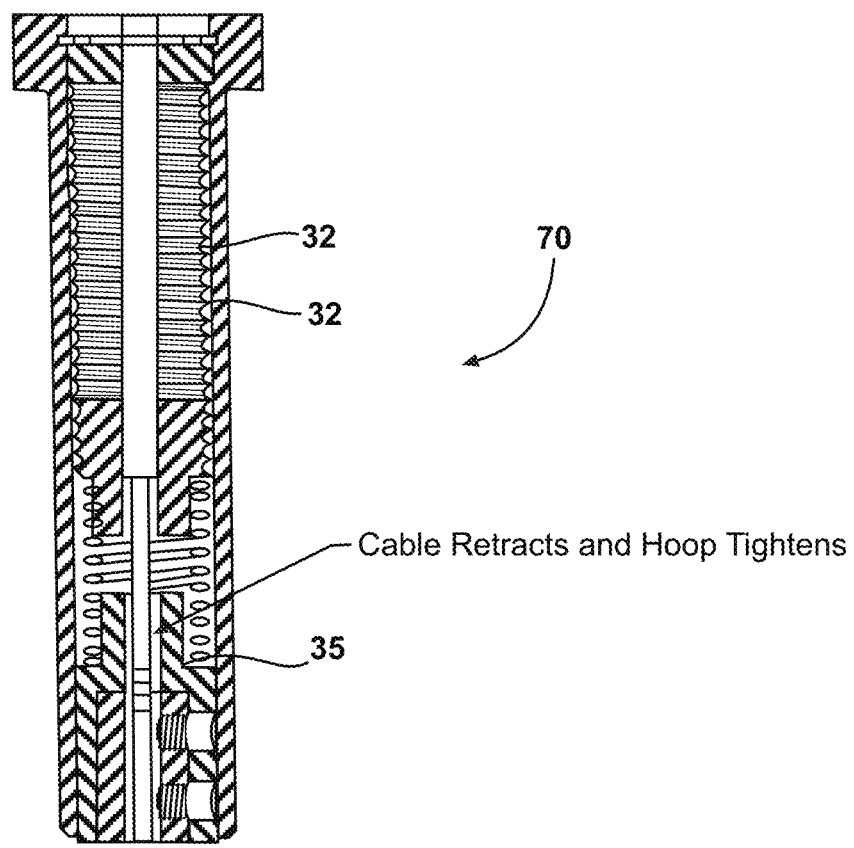
FIG. 8B is a sectional view taken along line A-A of FIG. 8, showing the boom cover assembly in a tightened configuration for retention on the boom.

Referring to FIG. 8, FIG. 8A and FIG. 8B, in anther embodiment the boom cover 10 may have spring loaded clutch 70 to prevent overtightening of the hoop 27 around the boom. The carrier 35 may be internally and threadably joined to the confluence frame 30 for longitudinal advance/retraction. Again, retraction away from the tines 23 tightens the hoop 27 while advance loosens the hoop 27. The carrier 35 is spring biased by a coil compression spring or equivalent. Particularly referring to FIG. 8A, in a relaxed, loosened state the carrier 35 is juxtaposed with the confluence frame 30 in a longitudinal position that allows for an expanded hoop 27. Particularly referring to FIG. 8B, clockwise rotation of the handle 60 retracts the carrier 35, thereby tightening the hoop 27. Longitudinal force due to compression of the spring and/or thread travel 32 may limit the longitudinal retraction of the carrier 35, thereby limiting the tightening of the hoop 27 as it circumscribes the boom.

Figure 9:
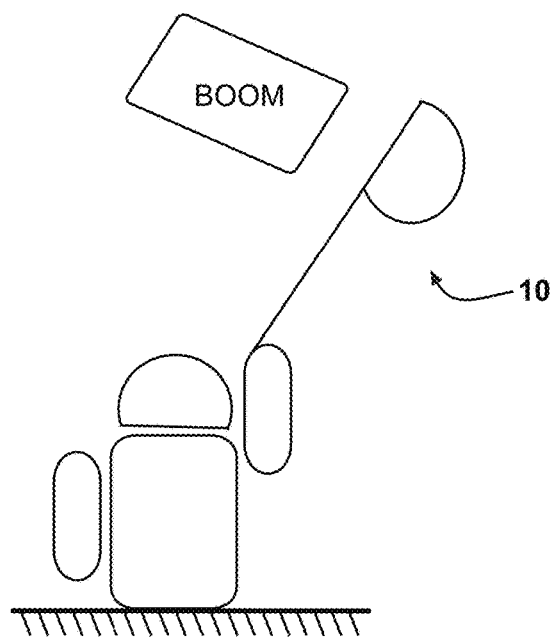
FIG. 9 is a schematic view of a user standing on the ground and deploying the claimed invention on a fragmentary refueling boom.

Referring to FIG. 9, in use, a user wanting to deploy the invention selects an aircraft having a refueling boom to be covered. The user retrieves the boom cover 10 and goes to the aircraft, proximate the boom. By way of nonlimiting example, the distal end of a KC 135 boom is approximately 4.6 to 5.4 meters above ground level. The user grasps the handle 60 and extends the extension pole 63 as necessary. The user raises the closure 20 and places the shield 21 over the boom opening and covers the opening with the shield 21. Upon application to the boom, the shield 21 may extend 15 to 36 cm back towards the proximal end of a KC 135 boom. The user then rotates the extension pole 63 until the desired hoop 27 force occurs and the hoop 27 tightly attaches the shield 21 over the end of the boom. The user then withdraws the extension pole 63, separating the handle 60 and closure 20. The closure 20 remains tightly attached to and covering the boom. The handle 60 may then be used with a different closure 20. This procedure is reversed for removal of the boom.

This arrangement provides the benefit that a single handle 60 may be used with a plurality of closures 20. The closures 20 may be identical for interchangeable use on the same aircraft or may be different for plural airframes and boom sizes.

As discussed above, current boom covers 10 require an elevated stand to be retrieved by aircraft ground crews, then positioned proximate the desired aircraft. A tug is necessary to retrieve and position the elevated stand. The elevated stand is disconnected from the tug. A two person crew secures the stand while a third person climbs the elevated stand, then manually attaches the boom cover using the cinch strap. The two person crew returns to the ground and the tug moves the elevated stand between various aircraft and the process is repeated. Upon completion of all desired aircraft being serviced, the stand has to be removed by the tug, stored indoors, then retrieved again for the next use.

In contrast, the present invention neither requires an elevated stand, a tug or a qualified tug operator. Additionally, the present invention can be deployed by a single person, cutting the required crew from three personnel to a single person. And the present invention can be fully implemented by the single person from the ground, eliminating the fall hazards of someone on an elevated stand. The present invention is believed to provide improved safety over the current system which requires two operators to climb a stand and encounter risk of falling during installation and removal of present day boom covers 10. The present invention has been shown to be fully operable and functional from the ground without requiring a ladder or stand. Furthermore, the boom cover of the present invention is faster to install and remove than current boom covers 10.

The present invention allows an operator to simply move from plane to plane with a boom cover and a single handle 60 or plural handles 60 as needed. If desired the operator may have a kit comprising a first plurality of closures 20 and a second and smaller plurality of handles 60, and a single handle 60 in a degenerate case. The boom cover of the present invention has been fully installed onto and removed from a KC 135 flying boom by a single person standing on the ground. In addition to improved safety, the present invention is estimated by the inventor to save 39,000 person-hours per year throughout just the Air force KC 135 fleet.

It is understood that all measurements herein are approximate and that the lower end of any range may be combined with the upper end of any range for that same parameter.

What is claimed is:

1. A closure for covering an elevated refueling boom of an aircraft, said closure comprising:
   a wishbone, said wishbone having two opposed divergent tines, each said tine extending from a proximal end to a distal end remote therefrom, said proximal ends of said tines being closely spaced to be joined at a confluence, said distal ends being spaced apart and defining a space therebetween, each said tine comprising a hollow tube for slidably holding a hoop therein;
   a hollow confluence frame, said confluence frame being threaded with confluence frame threads;
   a hollow carrier, said carrier having carrier threads complementary to and engaged with said confluence frame threads, said carrier and said confluence frame being defining a longitudinal axis and being rotatable one relative to the other about said longitudinal axis;
   a single hoop disposed in said tines to form a closed loop, said hoop having two free ends extending from said proximal ends of said tines and being inserted into said hollow carrier and being nonrotatably joined thereto, said hoop being alternatingly taut and flaccid in response to relative rotation between said confluence frame and said carrier whereby said closure can be attached to and removed from a refueling boom of an aircraft by relative rotation between said confluence frame and said carrier; and
   an impermeable shield joined to said hoop and filling said space of said wishbone, said shield being sized to cover a refueling boom of an aircraft when said closure is attached thereto.

2. A closure according to claim 1 wherein said confluence frame is internally threaded, said carrier is externally threaded and disposed inside said confluence frame and concentric with said longitudinal axis.

3. A closure according to claim 2 wherein said tines are symmetrically opposite and generally planar.

4. A closure according to claim 3 wherein said hoop is removably nonrotatably joined to said carrier.

5. A closure according to said 2 wherein said shield comprises scrim reinforced nonwoven fabric.

6. A longitudinally extendible closure for covering an elevated refueling boom of an aircraft, said closure comprising:
   a wishbone, said wishbone having two opposed divergent tines, each said tine extending from a proximal end to a distal end remote therefrom, said proximal ends of said tines being closely spaced to be joined at a confluence, said distal ends being spaced apart and defining a space therebetween, each said tine comprising a hollow tube for slidably holding a hoop therein;
   a hollow confluence frame longitudinally extending from a proximal end to a distal end, said confluence frame being threaded with confluence frame threads;
   a carrier internal to and concentric with said confluence frame, said carrier having carrier threads complementary to and engaged with said confluence frame threads, said carrier and said confluence frame being defining a longitudinal axis and being rotatable one relative to the other about said longitudinal axis;
   one of a receptacle or a driver disposed on said confluence frame for releasably receiving the other of a driver or receiver disposed on a longitudinally extending handle, whereby rotation of said handle causes like rotation of said confluence frame relative to said carrier;
   a single hoop disposed in said tines to form a closed loop, said hoop having two free ends extending from said proximal ends of said tines and being inserted into said hollow carrier and being nonrotatably joined thereto, said hoop being alternatingly taut and flaccid in response to relative rotation between said confluence frame and said carrier whereby said closure can be attached to and removed from a refueling boom of an aircraft by relative rotation between said confluence frame and said carrier; and
   an impermeable shield joined to said hoop and filling said space of said wishbone, said shield being sized to cover a refueling boom of an aircraft when said closure is attached thereto.

7. A closure according to claim 6 wherein said hoop has a circumference ranging from about 100 cm to about 107 cm when taut.

8. A closure according to claim 7 wherein said tines comprise stainless steel tubes and hoop comprises stainless steel cord disposed therein.

9. A closure according to claim 6 wherein said confluence frame comprises a receptacle thereon, said receptacle comprising a flange having a plurality of longitudinally oriented, equally circumferentially spaced holes sized to removably receive a like plurality of longitudinally oriented pins therein when said pins are joined to said handle to transmit torque between said handle and said closure.

10. A closure according to claim 6 wherein said receptacle confluence frame comprises a plurality of crenulations disposed on said proximal end of said confluence frame, said crenulations being sized to removably receive a like plurality of crenulations joined to said handle to transmit torque between said handle and said closure.

11. A boom cover adapted to be attachable to and removable from an elevated refueling boom of an aircraft by an operator on the ground, said boom cover comprising: a closure and a handle removably attachable to said closure,
- said closure for covering a distal end of the refueling boom comprising:
- a wishbone, said wishbone having two opposed divergent tines, each said tine extending from a proximal end to a distal end remote therefrom, said proximal ends of said tines being closely spaced to be joined at a confluence, said distal ends being spaced apart and defining a space therebetween, each said tine comprising a hollow tube for slidably holding a hoop therein;
- a hollow confluence frame, said confluence frame being threaded with confluence frame threads;
- a hollow carrier, said carrier having carrier threads complementary to and engaged with said confluence frame threads, said carrier and said confluence frame being defining a longitudinal axis and being rotatable one relative to the other about said longitudinal axis;
- one of a receptacle or a driver disposed on said confluence frame for releasably receiving the other of a driver or receiver disposed on a longitudinally extending handle, whereby rotation of said handle causes like rotation of said confluence frame relative to said carrier;
- a single hoop disposed in said tines to form a closed loop, said hoop having two free ends extending from said proximal ends of said tines and being inserted into said hollow carrier and being nonrotatably joined thereto, said hoop being alternatingly taut and flaccid in response to relative rotation between said confluence frame and said carrier whereby said closure can be attached to and removed from a refueling boom of an aircraft by relative rotation between said confluence frame and said carrier; and
- an impermeable shield joined to said hoop and filling said space of said wishbone, said shield being sized to cover a refueling boom of an aircraft when said closure is attached thereto;
- said handle comprising a longitudinally extending pole for grasping by a user and being concentric with said longitudinal axis, said pole having a proximal end and a distal end longitudinally spaced therefrom; and
- the other of a receptacle or a driver disposed on said distal end of said extendable pole for operably connecting said handle to said confluence frame, whereby rotation of said handle causes like rotation of said confluence frame relative to said carrier.

12. A boom cover according to claim 11 wherein said handle is operably and removably attachable
- to said closure, whereby said closure can remain on a boom and cover the open end thereof and when said handle is removed from said closure by an operator.

13. A boom cover according to claim 11 further comprising a clutch rotatably connecting said handle and said closure, said clutch limiting tightening of said hoop about the refueling boom responsive to rotation of said handle by an operator.

14. A boom cover according to claim 13 wherein said clutch comprises cooperating spring loaded ball bearings disposed on one of said closure and said handle and dimples disposed on the other of said handle and said closure.

15. A boom cover according to claim 14 wherein said clutch comprises radially oriented spring loaded bearing and cooperating radially oriented dimples.

16. A boom cover according to claim 11 further comprising a nonrotatable slotted washer disposed internal to said carrier and said proximal ends of said tines are nonrotatably disposed in said slot.

17. A boom cover according to claim 12 wherein said wishbone is planar and defines a circumference ranging from about 100 cm to about 107 cm when taut.

18. A boom cover according to claim 12 wherein said driver and said receptacle comprise a plurality of longitudinally extending holes and a like plurality of longitudinally oriented pins insertable therein for transmitting torque from said handle to said closure and removable therefrom for storage of said handle.

19. A boom cover according to claim 17 wherein said shield comprises scrim reinforced nonwoven fabric.

20. A boom cover according to claim 17 wherein said pole is a telescoping pole.

* * * * *